(No Model.)

M. L. GRIFFIN.
POISON DISTRIBUTER FOR FIELD USE.

No. 591,216. Patented Oct. 5, 1897.

Witnesses,
Inventor,
Martin L. Griffin
By Dewey & Co.
Attys

UNITED STATES PATENT OFFICE.

MARTIN L. GRIFFIN, OF PRIEST VALLEY, CALIFORNIA.

POISON-DISTRIBUTER FOR FIELD USE.

SPECIFICATION forming part of Letters Patent No. 591,216, dated October 5, 1897.

Application filed March 12, 1897. Serial No. 627,096. (No model.)

*To all whom it may concern:*

Be it known that I, MARTIN L. GRIFFIN, a citizen of the United States, residing at Priest Valley, county of Monterey, State of California, have invented an Improvement in Poison-Distributers for Field Use; and I hereby declare the following to be a full, clear, and exact description of the same.

My invention relates to a device which is especially useful for distributing and placing poison for the extermination of ground-squirrels, gophers, moles, and other vermin which burrow in the ground.

It consists in details of construction, which will be more fully explained by reference to the accompanying drawings, in which—

Figure 2:
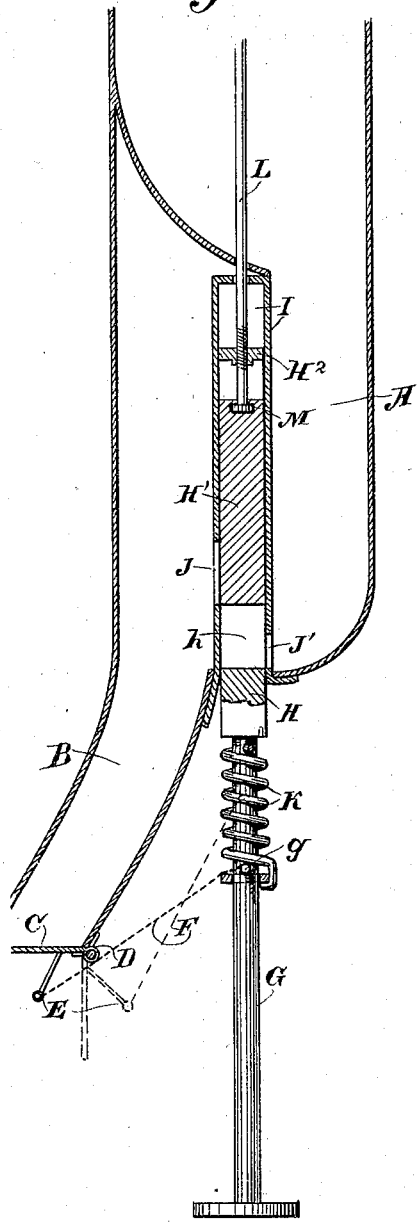
Figure 1:
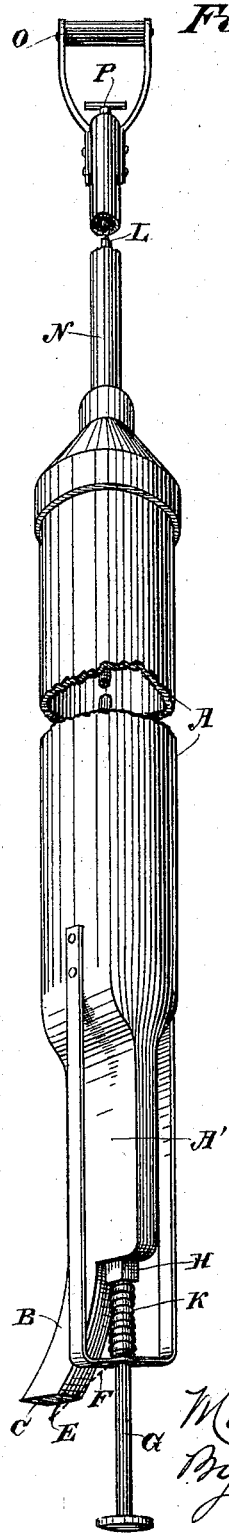
Figure 3:
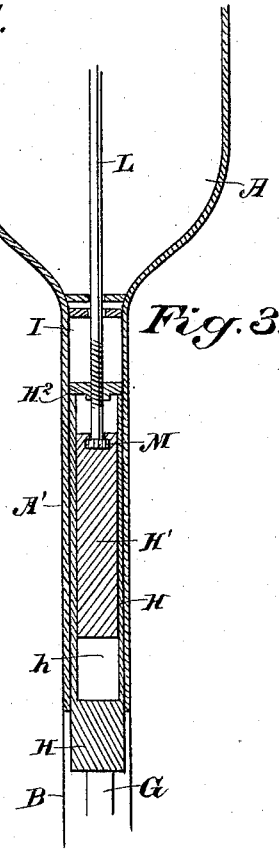

Figure 1 is a general perspective view of the device. Fig. 2 is an enlarged vertical section of the lower portion. Fig. 3 is a similar view taken at right angles to Fig. 2.

My device is especially designed so that a person riding on horseback or otherwise moving from place to place can carry it in the hand, and, passing from point to point where the vermin make their appearance, can deposit a certain regulated amount of the poisoned wheat, which is the substance preferably used for this purpose.

A is a casing of sufficient length and diameter to contain a convenient amount of the prepared poison. This casing is here shown as cylindrical for a portion of its length and at the point A' it is contracted into a flat rectangular shape at the lower end, as shown at A'. From one side of the lower end of this casing a discharge-spout B extends and is here shown as curving slightly outward. The lower end of this spout may be open, if preferred, but I have here shown it as provided with a gate C, having a spring-hinge D, which normally closes the gate against the bottom of the spout.

An arm E projects from the bottom of the gate and serves for the attachment of a cord or wire F, which in turn connects with a pin upon the stem or shank G, which projects through the bottom of the casing A' as shown.

The operation of this device will be described hereinafter.

The upper end of the stem G is fixed to a slide H, and this slide is movable in a channel I, which is formed in the flattened portion A' of the outer shell.

From the upper portion of the discharge-tube B, which extends up along the side of the channel I, a passage or opening J leads into the channel I, and from the opposite side and bottom of the flattened portion A' a similar passage J' opens into the opposite side of the channel I. Within this channel is fitted the slide H, the lower part of which is solid, as shown, and has the shank G connected with it, as previously described.

K is a spring surrounding the shank G and so connected that when the foot of the shank G is pressed upon the ground the spring yields and allows the slide H to move upward, and when the foot is removed from the ground the spring again resumes its normal position and moves the slide downwardly.

Within the slide H is a supplemental slidable piece H', and this is adjustable so that between the solid portion of the slide H and the part H' is formed a chamber $h$, and by adjusting the part H' the size of this chamber may be varied, as will be hereinafter described, so as to regulate the charge which is to be received into it. This chamber $h$ normally stands in line with the opening J' from the lower part A' of the holder, and in this position a portion of the contents will flow into the chamber $h$ and fill it. When the slide H is moved upwardly, the chamber $h$ will be carried up so as to cut off communication with the passage J' and bring it opposite to the passage J, with which communication is thus opened, and the contents of the chamber $h$ will flow out through J and into the discharge-tube B. As the pressure upon the shank G pushes the slide up it also acts, through the cord or chain F and the lever E, to open the gate C, previously described, and allow the charge to be delivered at the exact point desired. As soon as the pressure upon the shank G is relieved the spring brings the slide H H' back to its normal position, so as to allow another charge of grain to enter the chamber $h$, and this may be repeated as often as desired. The top of the slide H has a fixed cap $H^2$, and through this is a hole, which is screw-threaded to allow the rod L to pass, the rod being also screw-threaded, as shown.

The lower end of this rod has an enlarged head M, which is turnable in a corresponding socket or chamber in the upper part of the slide H'. It will be manifest from this construction that when the rod L is turned in one direction the screw-threads will cause it to advance and carry with it the inner slide H', thus correspondingly decreasing the size of the opening $h$. When turned in the opposite direction, the inner slide H' will be withdrawn and the chamber $h$ correspondingly enlarged.

From the upper end of the containing-chamber A extends a tubular extension N, which is of sufficient length for the purposes of the operator. If the operator is on foot, it need not be as long as when he is on horseback, and to the upper end of this extension N is fixed a handle O, by which the operator can conveniently carry and operate the device.

When the device is operated by pressing the foot of the shank G upon the ground, he simply presses down upon the handle O, and the operation will be as previously described.

The rod L extends up through the interior of the case A and through the extension N, having at its upper end and within the open sides which support the cross-bar O a head or cross-bar P, so that, if desired, the operator may pull up on this cross-bar P and the rod L and thus operate the slide H H'. The slide P also serves to turn the rod L when it is desired to adjust the inner slide H' and alter the capacity of the chamber $h$.

Having thus described my invention, what I claim as new, and desire to secure by Letters Patent, is—

1. A device for distributing and placing poison consisting of the containing-case having the rectangular extension at the lower end, a spout projecting from one side and below said extension, an intermediate channel between said spout and the opposite side of the extension of the case, openings made from the lower part of said extension into the intermediate channel, and from the channel into the discharge-spout and out of line with each other, a slide fitting and movable in the intermediate channel, a spring-pressed foot-piece connecting with said slide whereby pressure upon the foot-piece moves the slide upward and when relieved from said pressure allows the spring to return the slide to its normal position, a chamber formed in the slide and normally standing in line with the opening from the casing whereby the chamber is filled therefrom, said chamber being moved with the slide to cut off communication with the supply, and bring it into line so as to discharge its contents into the spout upon the opposite side.

2. A device for distributing and placing poison for vermin, consisting of a containing-case having a contracted extension at the lower end, a discharge-spout extending downwardly from the lower part of said extension, a closed channel intermediate between said spout and the opposite side of the extension having passages out of line with each other communicating respectively with the spout and with the extension, a slide fitting and movable in said passage, a foot-piece or shank fixed to the lower end of the slide so that pressure of the same upon the ground acts to move the slide upwardly within its channel, a spring connecting with the slide and foot-piece whereby the slide is returned to its normal position when pressure upon the foot-piece is relieved, a chamber formed in said slide standing normally in line to be filled from the lower part of the casing, said chamber being cut off from the source of supply and brought into communication with the discharge-spout by the upward movement of the slide and returned to its normal position by the action of the spring, and a spring-closed gate at the lower end of the spout, with connections whereby it is opened and closed in unison with the movement of the slide.

3. A device for distributing and placing poison for vermin, consisting of a containing-case having a contracted extension at the lower end, a discharge-spout projecting downwardly from one side of said extension, a closed channel intermediate between the spout and the opposite side of the extension, passages connecting the extension with said channel and with the spout, out of line with each other, a slide movable in the intermediate channel having a spring-pressed foot-piece whereby pressure upon the lower end of said foot-piece moves the slide upwardly and when relieved from said pressure returns the slide to its normal position, a chamber formed in said slide adapted to be brought alternately into line with the supply-passage from the containing-case and with the discharge-passage into the spout, and an adjustable moving side to said chamber whereby the amount received and discharged may be regulated.

4. A poison distributing and placing device consisting of the containing-case having the contracted lower end, a discharge-spout connected with and extending downward from one side, an intermediate channel having openings out of line with each other communicating respectively with the discharge-spout and with the containing-case, a slide movable in the intermediate channel having an independent slidable block forming a chamber between itself and the lower end of the main slide, a screw-threaded rod extending through the top of the main slide having a swivel-head in the lower end turning loosely in the sliding block whereby the latter is movable to increase or diminish the size of the chamber in the slide.

5. A device for distributing and placing poison consisting of a containing-case having the contracted extension at the lower end, a discharge-spout extending downwardly from one side thereof, an intermediate closed channel between said spout and the opposite side of the containing-case having passages out of line with each other communicating respectively with the discharge-spout and with the containing-case, a slide movable in the intermediate channel having an adjustable chamber formed within it and capable of being brought alternately into line with the passage to the containing-chamber and with the passage to the discharge-spout, a rod connecting with the slide and adapted to regulate the size in the chamber thereof by turning, said rod extending upwardly from the top of the containing-case, a tubular extension or handle within which the rod is movable having a handle at the upper end and an independent handle upon the rod whereby the latter may be turned, and whereby it may also be used to move the slide independently of the foot-piece.

In witness whereof I have hereunto set my hand.

MARTIN L. GRIFFIN.

Witnesses:
S. H. NOURSE,
JESSIE C. BRODIE.